A. N. EATON.
GRAIN BIN.
APPLICATION FILED AUG. 7, 1916.
1,217,424.
Patented Feb. 27, 1917.
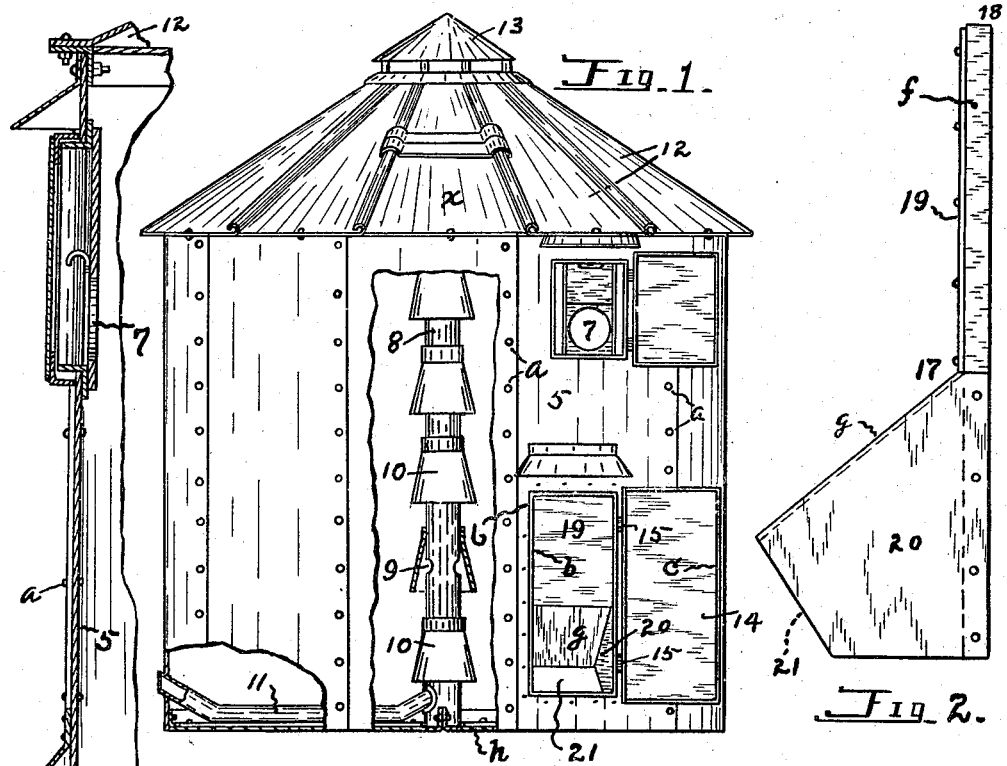
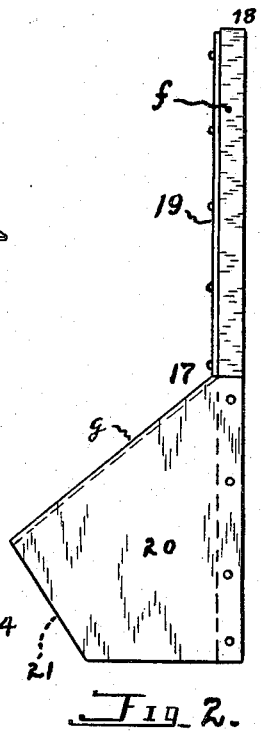
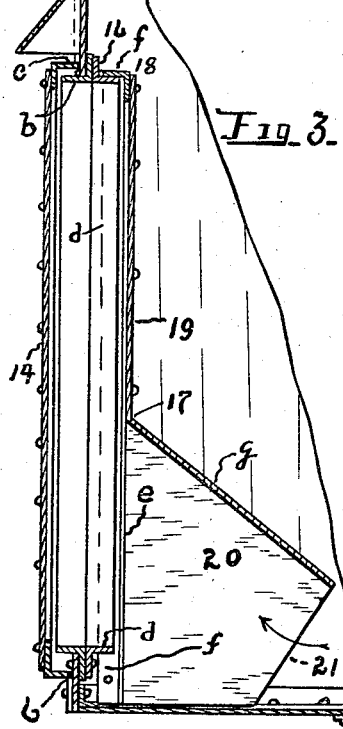
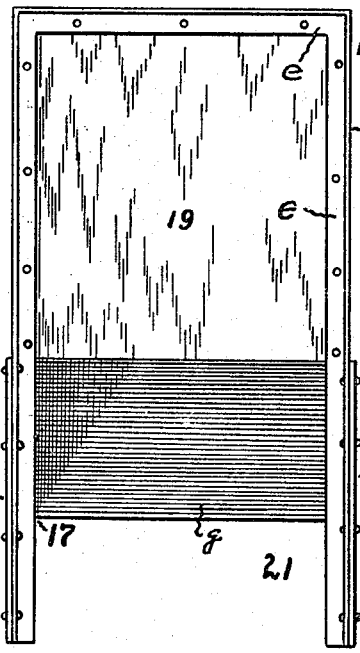
Inventor
Albert N. Eaton,
By —
Hiram A. Sturgell,
Attorney

UNITED STATES PATENT OFFICE.

ALBERT N. EATON, OF OMAHA, NEBRASKA.

GRAIN-BIN.

1,217,424.  Specification of Letters Patent.  Patented Feb. 27, 1917.

Application filed August 7, 1916. Serial No. 113,420.

*To all whom it may concern:*

Be it known that I, ALBERT N. EATON, a citizen of the United States, residing at Omaha, in the county of Douglas and State of Nebraska, have invented certain new and useful Improvements in Grain-Bins, of which the following is a specification.

This invention relates to an improvement in grain bins, and has for one of its objects to provide a bin of sheet metal consisting of parts which may be packed to occupy a limited space when shipped from the factory, to save freight charges, and which may be conveniently assembled ready for use by any person of ordinary skill, without soldering.

Another object is to provide a portable grain bin which will be convenient in use when filling or removing the grain. The invention includes the provision of certain ports or exit ways and closures therefor found to be of advantage in the use of the bin and certain means for ventilation, and consists of the novel construction, combination and arrangement of parts as described herein and claimed, and as illustrated in the accompanying drawing, wherein,—

Figure 1 is a view in side elevation, of a grain bin embodying the invention, parts being broken away and in section. Fig. 2 is a view in side elevation of the fender. Fig. 3 is an enlarged detail relating to Fig. 1, being a view in longitudinal section through the wall of the bin and ports thereof, and through the fender. Fig. 4 is a view of the fender in front elevation.

Referring now to the drawing for a more particular description, the upright, circular wall of the bin may be constructed by using strips of sheet metal connected by rivets at their longitudinal edges, and preferably having a strip or section 5 provided near its lower end with a comparatively large, rectangular doorway or man hole 6 for the removal of grain, and an upper aperture 7 for the intake of grain, bolts $a$ being employed for connecting this section with the wall of the bin, so that said wall may be rolled, to occupy a limited space for shipping.

At 8 is indicated an upright flue provided at longitudinal intervals with apertures 9, hoods 10 of inverted funnel shape being mounted on the flue to overhang said apertures, tending to prevent grain from entering therein, and to permit ventilation, said flue being provided at its lower end with a conduit 11 for the intake of air.

The top of the bin consists of a plurality of convergent segments 12 which may be packed within a limited space when shipped, one of these segments being provided with a door $x$ for the intake of grain, and the segments, by use of bolts, may be readily assembled to provide a cone shaped top. Numeral 13 indicates a cap adapted to overhang the flue and upper ends of the segments to prevent rain from entering the bin and to permit ventilation.

A rectangular door 14 is arranged to swing for closing the man hole 6, the hinges on the outer side of section 5 for said door, being indicated at 15. An angle iron, suitably bent to a rectangular form, is mounted on the wall of the bin, its flange $b$ projecting outwardly to operate in conjunction with the flange $c$ of the door 14, so that when the door is closed, rain, mice or insects will be excluded from the bin. By referring to Fig. 3 it will be seen that a second angle iron 16 of rectangular form is employed. It is secured to the wall of the bin and is provided with a flange $d$ which projects inwardly of the bin at the top and sides of the doorway 6.

This comparatively large doorway near the bottom of the bin is a matter of great convenience, since it is occasionally necessary that an operator should enter. In order that the grain will not move outwardly from the bin when the door 14 is opened, a fender 17 is provided, which however may be readily moved inwardly of the bin or away from the doorway when the bin is empty or nearly so.

The fender consists, in part, of an angle iron 18 of substantially inverted U-shape to provide an upright frame. Upon the vertical flange $e$ of this angle iron is secured a web or barrier plate 19, its remaining flange $f$ projecting outwardly of the fender. When the fender is disposed in its normal position, the flange $f$ will be disposed outwardly of the sides and top of the inwardly projecting flange $d$ of the angle iron 16.

The barrier plate 19 of the fender is provided with a ledge $g$ which is inclined downwardly and outwardly from the angle iron 18 and said plate 19. Side plates 20 connect the inclined ledge $g$ with the flanges $f$ of the angle bar 18, the inclination and length of the ledge $g$ being such that its terminal or free edge will be disposed above the lower end of the fender to provide a port or passageway 21 between its sides 20. The fender therefore provides a hood which may be disposed to overhang the inwardly projecting flanges $d$ of the angle iron 16 of the door casing; and when the bin is filled, the grain will be supported by the vertical part of the barrier plate, its inclined part and the side plates, and will not reach the door, the port or passageway being disposed inwardly of and communicating with the doorway 6.

In operation, when the door 14 has been swung outwardly, grain may be removed from the passageway 21 by use of shovels or other means whenever desired, the weight of the grain causing a supply thereof to be deposited at said passageway, the inclined part 19 and side plates 20 preventing an excessive quantity of grain from reaching the doorway; and when the greater portion of the grain has been removed, the fender, which is supported by the bottom $h$ of the bin, may be pushed inwardly, so that an operator may enter through the doorway for removing the remaining part of the grain.

Having fully described construction, a further explanation relating to operation is not necessary. What I claim and desire to secure by Letters Patent is—

1. The combination with the wall of a grain bin having a doorway and provided with a frame having an upright angular part projecting inwardly of the doorway, of an upright fender provided with a frame having an outwardly projecting angular flange and provided with a port at its bottom, said fender being adapted to be moved on the bottom of the bin for making a closure of a part of the doorway, the flange of its hood being disposed in the vertical plane of the inwardly projecting, upright, angular part of said doorway, its port communicating with the doorway and said bin.

2. The combination with the wall of a grain bin having a doorway and provided with inwardly projecting flanges at the top and sides of said doorway, a fender consisting of an upright, angular frame having outwardly projecting flanges, a barrier plate mounted on the upper part of the frame opposite to said outwardly projecting flanges and having an inclined part terminating near the base of the frame to provide a port, said frame being movable within the bin for disposing its outwardly projecting flanges upon the outer sides of the inwardly projecting flanges of said wall, its port communicating with the bin and said doorway.

3. In combination with the wall of a grain bin having a doorway and provided with an inwardly projecting, angular flange, a fender consisting of an upright, angular frame having an outwardly projecting flange at its top and sides and provided at its upper part opposite to said outwardly projecting angular flange with a barrier plate, and provided at its lower part opposite to said outwardly projecting flange with a downwardly inclined ledge with side plates, said ledge terminating in a plane above the lower end of said upright frame to provide a port in combination with the side plates, said upright fender being adapted to be moved upon the bottom of the bin and to be disposed with its outwardly projecting angular flange disposed outwardly of the inwardly projecting angular flange of said wall, its port being in communication with said doorway.

In testimony whereof, I have affixed my signature in presence of two witnesses.

ALBERT N. EATON.

Witnesses:
 HIRAM A. STURGES,
 ARTHUR H. STURGES.

Copies of this patent may be obtained for five cents each, by addressing the "Commissioner of Patents, Washington, D. C."